United States Patent [19]

Leban

[11] 4,228,507
[45] Oct. 14, 1980

[54] METHODS AND MEANS FOR REPRODUCING NON-ALPHABETIC CHARACTERS

[76] Inventor: Carl Leban, 608 Saratoga Pl., Lawrence, Kans. 66044

[21] Appl. No.: 255,867

[22] Filed: May 22, 1972

Related U.S. Application Data

[63] Continuation-in-part of Ser. No. 742,076, Jul. 2, 1968, Pat. No. 3,665,450, and Ser. No. 682,400, Nov. 13, 1967, abandoned, said Ser. No. 742,076, is a continuation-in-part of Ser. No. 682,400, , abandoned.

[51] Int. Cl.² ............................................. G06F 15/20
[52] U.S. Cl. .................................. 364/419; 340/711; 340/751; 364/200; 364/518; 400/110
[58] Field of Search ............. 444/1; 235/151.22; 340/172.5, 324 A, 324 AD, 711, 751; 178/4, 30; 95/4.5 J; 400/110, 484; 364/300, 200, 419, 518

[56] References Cited

U.S. PATENT DOCUMENTS

| | | | |
|---|---|---|---|
| 3,162,105 | 12/1964 | Moyroud | 178/4 X |
| 3,325,786 | 6/1967 | Shashoua et al. | 340/172.5 |
| 3,335,416 | 8/1967 | Hughes | 340/324 A |
| 3,444,319 | 5/1969 | Artzt et al. | 340/324 AD X |
| 3,665,450 | 5/1972 | Leban | 340/324 A |

OTHER PUBLICATIONS

G. F. Groner et al., "On-Line Computer Classification of Handprinted Chinese Characters as a Translation Aid", IEEE Transactions on Electronic Computers, Dec. 1967, pp. 856-860.

*Primary Examiner*—Jerry Smith
*Attorney, Agent, or Firm*—Leo Stanger

[57] ABSTRACT

Non-alphabetic characters are reproduced by feeding into a computer symbols defining the gross form of each character, then feeding in successive pairs of symbols, with one symbol in each pair defining an element of the character and another symbol defining the juxtaposition of each element relative to previous elements. The operation of the computer is fixed by a program to cause a plotter to draw the elements in accordance with their juxtaposition and thereby form the characters.

11 Claims, 91 Drawing Figures

Fig. 2

| symbol | code | name | symbol | code | name |
|---|---|---|---|---|---|
| / | pa | left slant | \ | ap | right slant |
| — | ba | horizontal | \| | ab | vertical |
| + | ta | cross | × | at | oblique cross |
| ⟋ | da | left slant cross | ⟍ | ad | right slant cross |
| ⌈ | ka | upper left corner | ⌉ | ak | upper right corner |
| ⌊ | ga | lower left corner | ⌋ | ag | lower right corner |
|  | sa | square step |  | as | slant step |
|  | za | square zed | Z | az | slant zed |
| /\ | fa | left and right slant | \/ | af | right and left slant |
| ′. | va | left over right dot | `, | av | right over left dot |
| □ | ma | square | □ | am | full-space square |
| ▭ | na | horizontal rectangle | ▯ | an | vertical rectangle |
| , | ca | left dot | ` | ac | right dot |
|  | ja | left-right dot-flanked vertical |  | aj | right-left dot-flanked vertical |
| < | la | left angle |  | al | angular "3" |
| ⟨ | ra | left acute angle | ⟩ | ar | right acute angle |
| ) | xa | left curve | ⌒ | ax | right curve |
| ⌐ | ha | counter-clockwise hook | ⌙ | ah | clockwise hook |

22

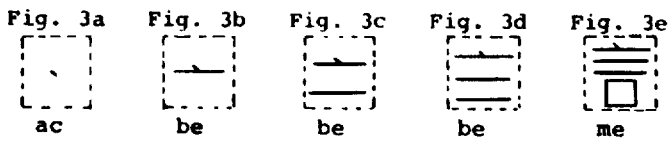
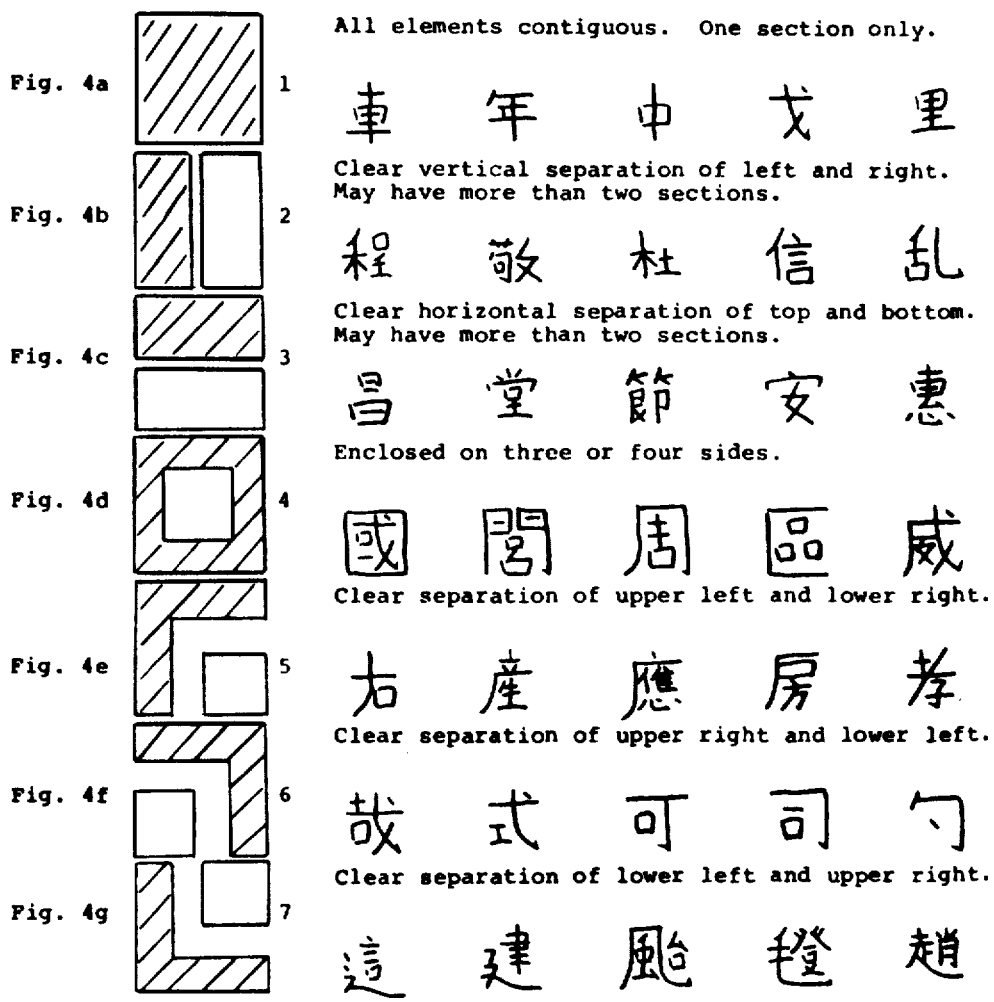

Fig. 5a　′ﾍﾍﾍ occurs alone as 火 = 1, but 然 = 3.

Fig. 5b　𥫗 occurs alone as 竹 = 2, but 節 = 3.

Fig. 5c　⺿ occurs alone as 艸 = 2, but 茄 = 3.

Fig. 5d　髟 = 2, but 鬆 = 3.

Fig. 5e　羽 = 2, but 翌 = 3.

Fig. 5f　非 = 2, but 靠 = 3.

Fig. 5g　鼓 = 2, but 鼕 = 3.

Fig. 5h　龍 = 2, but 龔 = 3.

Fig. 5i　門 = 2, but 閉 = 4, and 閒 = 3.

Fig. 5j　鬥 = 2, but 鬪 = 4.

Fig. 7a  ⼞⼞ mama    ⊢ abba    ++ tata

Fig. 7b  ⼞ mame    ⊥ abbe    土 tabe
         ⼞

Fig. 7c  ⼂⼅ akic   式 admi   才 tapi

Fig. 7d  ⽇ mabo    ⼂ gapo   右 damo

Fig. 7e  ⼼ maub    ⼃ gapu   犬 adpu

Fig. 11  anbobe)  ⽇       ampoteme)  ⚇ akbibe)  ⼹       paaruxobza) 矢

Fig. 12  paakinbobe) 旬    daqinbobe) onbobe)pe)) 爽

Fig. 13  mato 田   najo ⚇   ampoga) ⼏   naobab) ⚇

Fig. 14  bayeebak 冂      Fig. 15   abqarxeye 阝

Fig. 16  yyababbabe 止    Fig. 17   tide ⚇   oced ⚇

Fig. 18  icicirex ⚇       irirux ⚇

Fig. 19  tioced ⚇         icbiifoced ⚇

Fig. 10a

| Element | "q" | S/C | Containment | u-ablaut | Juncture |
|---|---|---|---|---|---|
| ╱ pa | ╱ paq | 1 | ╱o 人 | total 吏 彡 | 彳亍 犭 入 了 石 |
| ― ba | | 1 | ー o 百 來 | total 田 丰 | incidental |
| ╋ ta | | 2 | ╂o 夾 | 十 夫 | |
| ╈ da | ナ daq | 2 | ╁o 病 | ナ | |
| ⌐ ka | 厂 kaq | 2 | ⌐o 山 | | |
| ⌊ ga | | 1 | ⌊o 与 | 七 毋 电 | |
| ⌐ sa | | 1 | ⌐o 颱 | | |
| ⌐ za | ⌐ zaq | 1 | ⌐o 合 | | |
| ∧ fa | | 2 | ∧o | ∧ 木 | |
| ʻ va | | 2 | | | |
| □ ma | | 3 | □o 田 | | |
| □ na | | 3 | □o 皿 | | |
| ʻ ca | | 1 | | | |
| 小 ja | | 3 | | | |
| 〈 la | | 1 | | total 女 | |
| 〈 ra | | 1 | | 东 | |
| ⌒ xa | | 1 | )o 豸 | 豸 | ⌄ |
| ⌄ ha | | 0 | | | |

Fig. 10b

| Element | "q" | S/C | Containment | | u-ablaut | Juncture |
|---|---|---|---|---|---|---|
| \ ap | ⟨ apq | 1 | i\o | 入 | 曳 | ⌒ ∧ |
| \| ab | | 1 | i\|o | 五 | 申 | |
| ✕ at | | 2 | ✕ | ※ | | |
| ✚ ad | 七 adq | 2 | i\o | 式 | | |
| ⌐ ak | | 1 | i | 司 | | |
| ⌐ ag | | 2 | i | 乖 | | |
| ⌇ as | | 1 | ⌇o | 亟 | 与 专 | |
| ⌇ az | | 1 | | | | |
| \/ af | | 2 | | | | |
| ` av | | 2 | | | | |
| □ am | | 3 | □o | 囚 | | |
| □ an | | 3 | □o | 目 | | |
| ` ac | | 1 | | | | ⌇ ∠ ⏋ |
| ⌄ aj | | 3 | | | | |
| ⌇ al | | 1 | i⌇o | 历 | | |
| ╱ ar | ⏋ | 1 | i⏋ | 夕 | | |
| ⌒ ax | | 1 | ⌒o | 夂 | ⌒ 夊 | ⋁ |
| ⌵ ah | | 0 | | | | |

Fig. 20 fafayaaced 艸 abmaboyaaced 屮

Fig. 21 2acecpe*tataneobab) ockequpqpuoc 漢

Fig. 22 lareacwa oced 丝 mamematefu 樂 aceticocec 火 fafatebe 坐

Fig. 23 maub 中 bamebotu 車

Fig. 24 (pabetu 手 (baekubbe 五

Fig. 25 mato 田 (maboub 甲 maboub 申 ma(boub 由

Fig. 26 ma(pebatu 早  Fig. 27 ma(pebetu 旱

Fig. 28 abakbibeub) 用 kabobeub) 冊 naobabbu) 田

Fig. 29 naobab)bu 冊

Fig. 30 (bayeebakubiv vo) 雨 (bafeebakubitet)otet) 霝

Fig. 31 (akgubuocec) 母 cipeqakqbuicec) 舟

Fig. 32 akpu 九 gapu 匕 arup 又

Fig. 33 tapu 才 tafu 木 daux 大 adpu 文

Fig. 34 abakbu 卅 akbitu 丰 but: arup 又 paarup 夊 (paarup 夂

Fig. 35 akgiob)bu 田 abakbu(ubbu 冊 bafetu 本 bamepuqup 攴 baneoffeub 東 ockequpqpu 戊

Fig. 36 (akguobbu 田 abakbubu 毌 babepuqubq 井

Fig. 37 abqakerup 及 abqarxeye 阝

Fig. 38 3kabobe)bereac/papepe*tafu/fareac 松

Fig. 39 1ciebqakbibebeq/ekicacacac) 鳥

Fig. 40 babebe/ab-ab/babebe
bababibe)abbabobe) 非

Fig. 41 2tafu*wa 林

1daq-bipimebo)woep) 爽

3gaobqab*paqakqicec)wa 崩

Fig. 42 bate 干 batehe 干

Fig. 43 arecbeqhaebhe 予

Fig. 44 ocedqehpu 戈 abqehakbeedeh 民 anbobe)pegaah 見

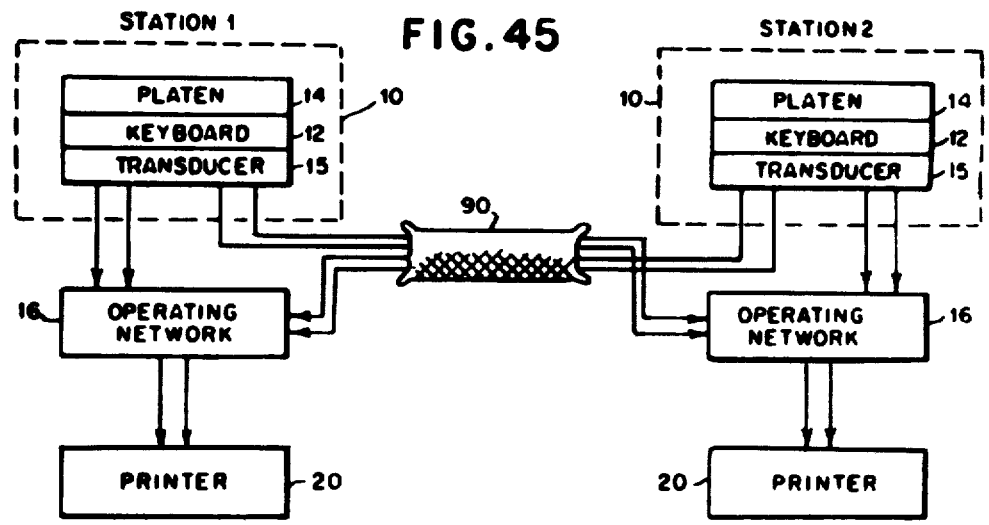
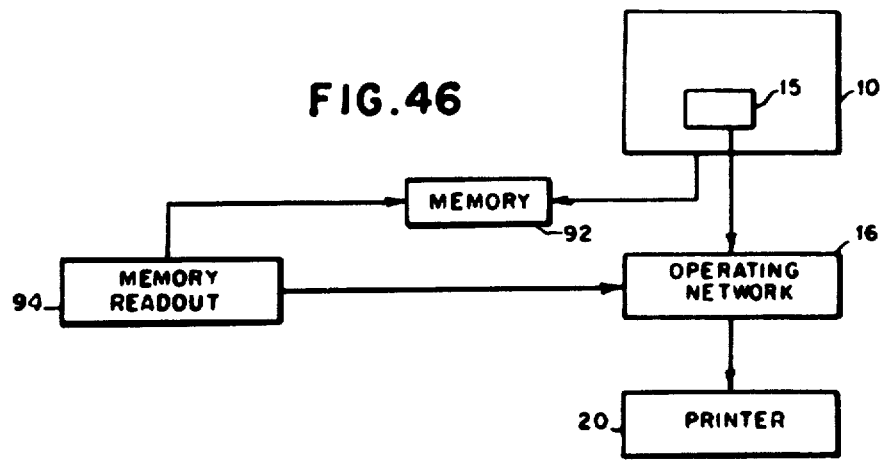

METHODS AND MEANS FOR REPRODUCING NON-ALPHABETIC CHARACTERS

REFERENCE TO CO-PENDING APPLICATIONS

This is a continuation-in-part of the co-pending application of CARL LEBAN, Ser. No. 742,076, filed July 2, 1968. That application will become U.S. Pat. No. 3,665,450 on Mar. 23, 1972. The content of that application and that patent are hereby made a part of this application as if completely recited herein.

The parent application, Ser. No. 742,076, is a continuation-in-part of the application of CARL LEBAN, Ser. No. 682,400, filed Nov. 13, 1967, (now abandoned). The present application is thus, through the intermediate parent application, Ser. No. 742,076, a continuation-in-part of the original application, Ser. No. 682,400.

BACKGROUND OF THE INVENTION

The invention relates to transcribing ideographic characters, particularly Chinese, Japanese, and Korean language characters so they may be classified, indexed and rewritten. According to one aspect the invention relates to a typewriter for writing any or all of the approximately fifty-thousand existing Chinese language characters, as well as any yet to be created, with a simple keyboard.

The Chinese language and other oriental languages are written in some fifty-thousand or so characters that comprise a number of strokes of varying sizes and positions within each character. This method of writing contrasts with other written languages such as English or other European alphabetic languages which employ alphabets having a small number of digits or letters. Numbers of such letters of similar size are assembled and arranged in specific order within each word and follow each other sequentially in one specific direction such as left to right across the page. This sequence and directional arrangement of a small number of letters permits classifying the words on the basis of the letters' conventional locations in the alphabet, that is alphabetically. As a result, alphabetically written languages are amenable to type setting, typewriting, telegraphy, and/sorting through assembly and disassembly of the letters. On the other hand Chinese language characters are not readily disassembled or reassembled. Thus, until now no means have been found to obtain commensurate advantages for the Chinese language and its characters. The Chinese language for example uses a telegraphic code that consists of arbitrary dot and dash combinations, namely the international Morse Code for the Numbers 0 through 9,999 for less than the 10,000 of the almost 50,000 characters in the Chinese language. Moreover, Chinese language texts, even important reference works, newspapers and periodicals, are indexed inadequately if at all. The efficient use of modern data processing techniques has been substantially blocked by this problem. Attempts to remedy this situation have depended upon the application or modification of traditional analytic classification systems.

SUMMARY OF THE INVENTION

According to a feature of the invention the aforesaid difficulties are overcome by assigning to each of a number of arbitrarily selected constituent elements of any character a machine compatible number or letter while assigning for each of a number of inherent positional relationships of the character another machine-compatible number or letter, and assembling the numbers or letters of the elements in predetermined order into code words. The numbers or letters used herein may be generically described as digits.

According to another feature of the invention the coding is simplified by adding digits to indicate each character's gross form.

According to yet another feature of the invention a typewriter is obtained. Specifically an operator enters the code for any character into a computer whose structure has been altered by programming to analyze the symbols entered into the computer, and then operating a plotter to effectively reconstruct the characters. Entry is accomplished by a keyboard.

These and other features of the invention are pointed out in the claims. Other objects and advantages of the invention will be understood from the following detailed description when read in light of the accompanying drawings.

BRIEF DESCRIPTION OF THE DRAWINGS

FIG. 2 is a chart illustrating the elements which the apparatus of FIG. 1 prints out separately;

FIGS. 3a to 3e are diagrams illustrating progressive print out of the apparatus in FIG. 1 for particular inputs;

FIGS. 4a to 4g are charts illustrating gross forms of Chinese language characters which the apparatus of FIG. 1 recognizes and illustrating samples of characters conforming to each gross form;

FIG. 5 which comprises FIGS. 5a-5j is a chart illustrating other examples of the manner in which the apparatus of FIG. 1 recognizes the forms of FIGS. 4a to 4g;

FIGS. 6a to 6d are charts illustrating forms which the apparatus of FIG. 1 recognizes as contiguous;

FIG. 7 which comprises FIGS. 7a-7e is a chart illustrating the juxtaposition of elements that the apparatus of FIG. 1 prints out in response to the shown inputs;

FIGS. 8a to 8g and 9a to 9d are diagrams illustrating progressively the print out of the apparatus of FIG. 1 for particular inputs;

FIGS. 10a and 10b are charts illustrating characteristics of the elements of FIG. 2;

FIGS. 11 to 18 illustrate examples of characters printed out by the apparatus of FIG. 1 in response to the accompanying alphabetical inputs;

FIGS. 19 to 44 are examples of Chinese character printouts for the alphabetic or digital inputs that accompany them;

FIGS. 45 and 46 are block diagrams of other systems embodying features of the invention, namely a transmitting system and an indexing system;

DESCRIPTION OF PREFERRED EMBODIMENTS

Figure 1:
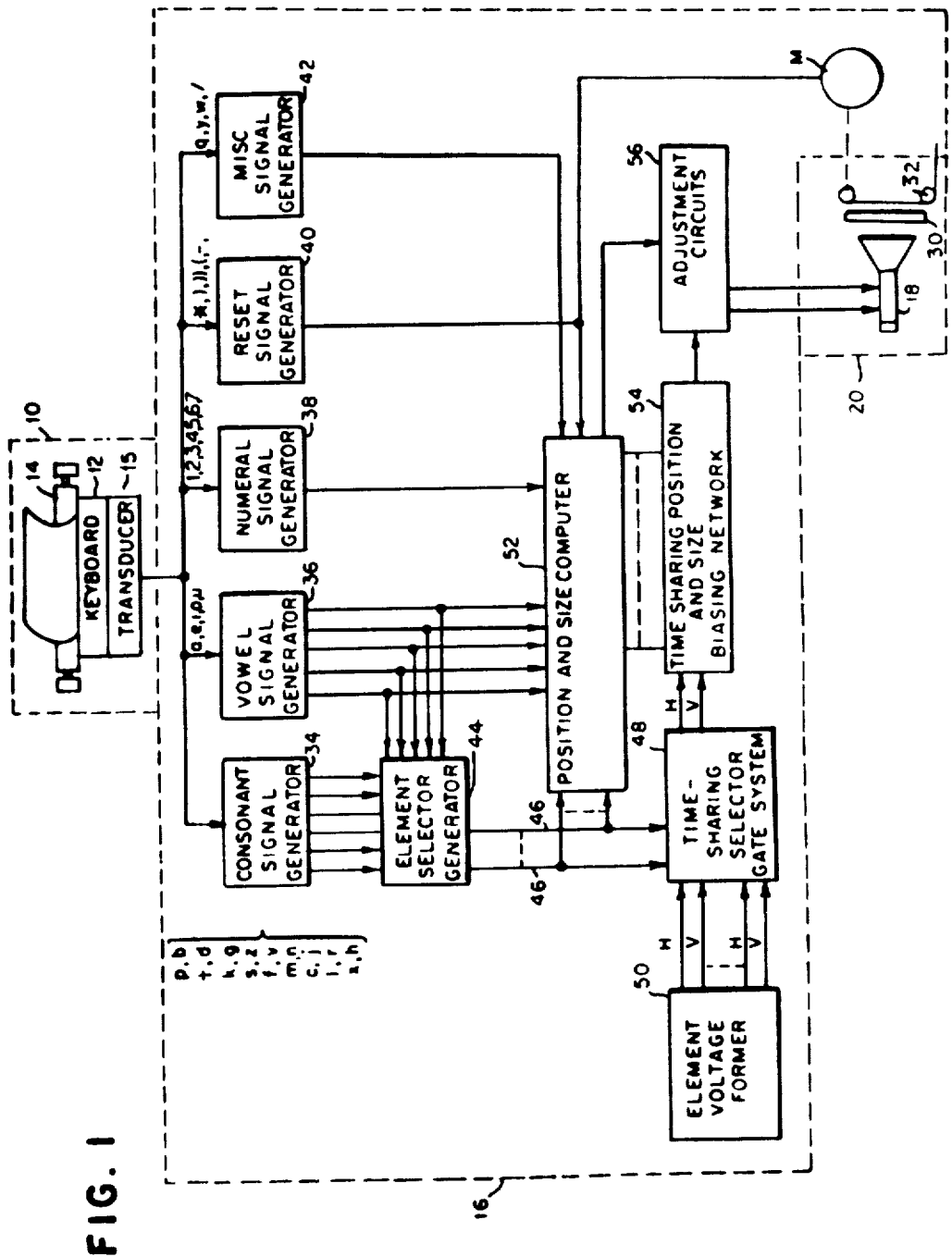
FIG. 1 is a schematic diagram illustrating an apparatus embodying features of the invention.

In FIG. 1 an input mechanism 10 corresponds to a conventional typewriter having a keyboard 12 and a platen 14. However, in FIG. 1 the keyboard includes a transducer 15 that transmits electrical signals corresponding to the letters being struck on the keyboard 12 to an electronic operating network 16. Each time the pairs of English language letters shown in FIG. 2 are struck on the keyboard the network 16 applies a pair of time-function voltages to the beam deflecting members of a cathode ray tube 18 in an optical printer 20 so as to produce an image corresponding to the 36 elements 22 illustrated in FIG. 2. Each element 22 represents a stroke or group of strokes of the written Chinese language. When properly reduced or magnified and juxtaposed these thirty-six elements form substantially all the Chinese language characters now in existence and yet to be developed.

FIG. 2 shows these thirty-six elements arranged in two columns. The general characteristics of the left column are left orientation, horizontality, orthogonality. The general characteristics of the right column are right orientation, verticality and slantness. Each element is represented by a consonant of the English language as indicated in the table. Those consonants in the left column precede a vowel. Those consonents in the right column follow a vowel. Each pair of elements is further paired to form a quartet of elements of similar form. Such quartets are represented by pairs of related consonents as follows:

p,b: single straight lines
t,d: crossed lines
k,g: corners
s,z: zig-zags
f,v: paired slants or dots
m,n: rectangles
c,j: dots
l,r: angles
m,h: curves and hooks Voltages producing the same images corresponding to the thirty-six elements 22 illustrated in FIG. 2 are also available by striking for each letter a in FIG. 2 and other vowels such as e i o or u. The operating network distinguishes between these vowels to apply direct current biasing potentials that position the images relative to one another on the face of tube 18.

Striking the vowel a in each element 22 FIG. 2 causes the operating network 16 to apply no direct biasing potentials if the element is the first element of a character being entered. If it is not the first, striking the vowel a causes network 16 to apply biasing potential which shifts the image being formed horizontally to the right and shifts the preceding element entered to the left so that the new element is adjacent to the right of the previous element. Striking the vowel e in an element which it and a consonant in FIG. 2 define creates biasing potentials that vertically position the image of the element below the immediately preceding entered element 22. The vowel i indicates an element contained in the left part of a previous element or displaced to the left of the vertical centerline of a structure being developed. Thus striking the key for this letter causes the network 16 to produce biasing voltages which shifts the image of the element to the left. In some cases, if the previous containing images are such as to contain only on their left, their corresponding voltages generate additional potentials to cancel this leftward shift of the "i" image.

The vowel o is struck by the operator as part of an element to indicate any element contained on the right of the previous element which was not a rectangle, or contained in any rectangle, or any element displaced to the right of the vertical centerline of the structure being written. Thus the operating network 16 creates voltages which shift the image on tube 18 to the right in response to the letter o. If the previous element contains only on the right or centrally, or is a rectangle, the network 16 does not shift the "o" image at all.

The vowel u indicates elements written over preceding elements. The network 16 biases the image forming voltages to place the element image over the previous element image or images.

The operating network 16 moreover has attenuating means which responds to the number of elements typed in each character to thereby attenuate the image producing voltages to produce their images within a square of the cathode ray tube 18. The attenuation for the first element entered is such as to cause it to fill the square. Dots such as defined by ac, ca, av, and va may vary only slightly in size and so occupy only a portion of a square. Thus if the letters ac were typed first, the image on the tube would appear as in FIG. 3a. If these letters were followed by be the image would be changed as shown in FIG. 3b. Again following these letters with be and be respectively produces the images of FIGS. 3c and 3d. FIG. 3e illustrates the result of adding the letters me to produce acbebebeme.

Chinese language characters may be divided into a small number of groups according to their gross morphology, that is their general shape. To simplify the operator's task the operating network 16 further biases the output signals so that the elements 22 of a character can be considered by the operator in groups and entered on the keyboard in groups. The operating network 16 distinguishes between seven such groups based on that number of arrangements of non-contiguous portions of the character, called sections. The arrangements of sections are shown in FIGS. 4a to 4g. An operator precedes the entry of the first element 22 of a character by first entering a numeral which defines the character's gross form.

If all the elements are contiguous in the character so that it has only one section as shown by the example in FIG. 4a the operator precedes the entry of elements by striking the key 1 on the keyboard. On the other hand if there exists a clear separation between right and left, regardless of how many portions there are, as shown by the examples in the gross form mode of FIG. 4b he presses the numeral key 2. For characters with a clear horizontal separation of top and bottom as shown in FIG. 4c he strikes the numeral 3. Where the character is enclosed on 3 or 4 sides as in FIG. 4d he strikes 4. For a clear separation of upper left and lower right, or lower left and upper right as shown in FIGS. 4e and 4f he strikes 5 or 6 respectively. For the configuration of 4g he strikes 7 on the keyboard.

However, because the seven arrangements of FIGS. 4a to 4g do not account for all possible forms the operator arbitrarily responds to those not shown by striking the numeral 1. In cases where more than one arrangement of the sections shown may be possible, the operator strikes the lowest possible numeral.

In all these cases the operating network 16 responds by establishing biasing voltages on the beam deflecting elements of the tube 20 which confine element images to first the left section, or if there is not left section then the upper section, and after the operator enters an asterisk *, the right section or if there is no right section then the lower section.

Certain side by side entities when they occur alone are considered properly to be identified by the numeral 2. However, when they are combined with other forms as sections they are considered as if they were contiguous. These exceptions are shown in FIG. 5.

Contiguous structures are never split in determination of gross form numerals. Any structure is considered contiguous if any stroke necessarily or incidentally touches or crosses another stroke. Examples of such contiguous structures appear in FIG. 6a. Any structure composed of a series of parallel lines, dots or curves with no intervening strokes such as shown in FIG. 6b are considered to be contiguous for the purposes of FIGS. 4a to 4g. Moreover a structure is contiguous if it consists of horizontal lines immediately above or below a rectangle. Examples of such contiguous structures are shown in FIG. 6c. Other structures which are considered contiguous are ones with a dot immediately above any horizontal line or the horizontal portion of any element or structure including rectangles. This is shown in FIG. 6d.

Characters are typed on the keyboard with the defining section first followed by the remaining section or sections in order from upper left to lower right. The so-called defining sections of each of the gross forms in FIGS. 4a to 4g are shaded. They are the entire character in FIG. 4a, the left section in FIG. 4b, the upper section in FIG. 4c, the enclosing section in FIG. 4d, the upper left section in FIG. 4e, the upper right section in FIG. 4f, and the lower left section in FIG. 4g.

In entering characters in the keyboard, the gross form numeral corresponding to the arrangement of sections is written before the first element of the first section. After the numeral or number indicating gross form is entered and the operating network 16 establishes appropriate bias, the elements 22 of the character are typed. The elements 22 are entered from upper left to lower right, element by element, with upper taking priority over left and with the exceptions that containers precede the elements contained and over-writing elements follow the elements they over-write. Relative juxtaposition of elements is indicated by the vowel of the elemental syllable as illustrated in FIG. 7. FIG. 7 illustrates several pairs of elements with their appropriate alphabetic nomenclature and shows how the nomenclature follows the elements' juxtaposition.

After the numeral, as each pair of letters is typed to represent an element 22 and its position, the operating network 16 again performs the image positioning functions illustrated in FIGS. 3a to 3e. However, if the pairs of letters follow the numerals 2 to 7 the operating network 16 first fills the square of FIGS. 3a to 3e. As each element is entered it compresses the prior elements and shifts their position to accommodate the newly entered element. When an asterisk * marking a succeeding section is entered, the network 16 confines previously entered elements to the area of the respective defining section and controls the beam deflecting potentials to confine the elements following the asterisk to the other section or sections of the character. The first vowel in each section is always a, unless the first element is laterally displaced. Examples of this sequence appear in FIGS. 8a to 8f and 9a to 9d. Here the letters below each figure indicate the nomenclature entered and the image formed at each particular stage in forming the character. The elements which are basically dots, namely those defined by va, av, ca, and ac may vary only slightly in size and so occupy only a portion of the allotted space rather than a whole space when they start a section.

FIG. 10a to 10b tabulate the properties of all the elements. While most of these properties are inherent in the form of the respective elements some are arbitrary. Such arbitrary properties include mutant q-forms, containment function restricted to a portion of the element, crossover function restricted to a portion of the element and restricted juncture.

The column q in FIGS. 10a to 10b illustrate mutant forms for the elements on their lines. The network 16 responds to a q typed after typing of the elemental nomenclature by changing the image of that element on tube 18 to its mutant form. When a q follows the nomenclature of elements for which there are no q forms in FIGS. 10a and 10b the network 16 merely extends the image of the element on the tube 18 in length.

FIGS. 10a and 10b have a column of stroke counts, S/C. These values are available for automatic indexing of typed characters according to total stroke count when using a computer.

Most elements exhibit the property of containment, that is other elements may occasionally be written within their compass. The column headed "Containment", in FIGS. 10a and 10b shows those elements possessing this property. The portions of those elements employed in this function are marked i and o.

In Chinese characters some elements possess the property of over-writing other elements. These are indicated in the typed nomenclature by the u-ablaut, that is the u variation, of the elemental vowel such as bu or ul. In FIGS. 10a and 10b the column headed u-ablaut shows those elements which function in this manner. Some of these function totally, that is, any part of the element may over-write other elements. Some elements possessing u-ablaut are restricted in this function, with only part of the element over-writing other elements. Those parts are marked with a small circle in the illustration.

All elements possess the property of incidental juncture, that is they touch other elements at points determined by their respective forms and juxtaposition. Elements which do not touch are parallel elements or the parallel portions of elements, reduplicated elements or elements in reduplicated structures, and elements with intervening elemental space.

Four elements, the left and right slants, pa and ap, the right dot ac, and the left acute angle ra also possess restricted juncture. The illustrations FIG. 10a and 10b under the heading called "Juncture" show that when an element pa or ap is horizontally juxtaposed with the free horizontal portion of another element, or vertically juxtaposed with the free vertical portion of another element, that element touches the slant at midpoint. The effect is similar to oblique juxtaposition. The left acute angel ra, when juxtaposed below the left angle la, meets it at the mid-point of its own slant portion. The right dot ac meets the left and right acute angles and the slant step in the manner illustrated.

All q-forms exhibit incidental juncture only.

The printer 20 possesses an optical system 30 for focusing the image on tube 18 onto a photographic recorder 32. The latter shifts with each entry of a number 1–7 to a new space to start the image of a new character.

To use the typewriter, the operator first sets the recorder 32 to start with the first image. The defining section of any character is typed first, proceeding from upper left to lower right, one horizontal level at a time. Upper always takes priority over left except that containers precede the elements contained and over-writing elements follow the elements they over-write. Where ambiguity may arise, as in over-writing over only one other element, horizontal precedes vertical in the entries. The network 16 always evenly divides the space available for writing. The elements are evenly spaced within each level, and the various levels and columns are evenly spaced within the section or character. Symmetry and mirror image symmetry are obtained wherever possible.

Since typing proceeds from top to bottom, containment cannot occur from below, but is viewed as a process occurring at the same level as the container. The container is that element immediately preceding the contained element regardless of the complexity of the structure. Elements within the container follow the usual juxtapositional rules but they are removed from the larger juxtapositional stream. Thus the element following the contained element is juxtaposed relative to the container preceding. No mark is made to show the containment terminal for a single contained element. Where such cases occur the absence of a marker indicates that only the ablauted element is contained. When more than one element is contained it is necessary to mark the terminal so that ambiguity of juxtaposition is avoided. The containment terminal marker, is entered immediately following the last contained element. The element following the closed parenthesis is juxtaposed relative to the container. Some examples occur in FIG. 11. The network 16 then varies the image accordingly.

Occasionally an operator encounters a container which is itself contained. In such cases he types according to the usual rules with the qualification that when more than one element is contained in the inner container that terminal is typed as ) and the outer container terminal is doubly closed )), when necessary to avoid ambiguity. Examples appear in FIG. 12. The network 16 varies accordingly.

The square ma may contain only one element. In cases where a square contains more than one element the full space square am is entered and the network 16 fills the space available for writing. The oblong rectangles na and an may contain a single element although they more often contain two and rarely more than two. Some examples appear in FIG. 13. As contained elements are removed from the larger juxtapositional stream, so are they removed from the size determination inherent in that stream. The size of contained elements is determined by the size of the container and thus is only indirectly affected by the larger configuration. Thus the operator after entering such elements causes the network 16 to make no changes in the biasing potentials on the tube 18.

The network 16 must occasionally create a space necessarily occurring between elements that might otherwise touch. In the nomenclature such space is indicated by the symbol y followed by the appropriate juxtapositional vowel. It behaves like any other element. That is, it serves as a juxtapositional referent that may be contained or overwritten or both, or may be marked by terminal markers, and its size is determined in the same manner as any other element in the same structure. An example of its use appears in FIG. 14. Sometimes elemental space is required within a structure to secure proper spacing and size of other elements. An example appears in FIG. 15. Sometimes space may be required as part of an element, in effect a shortening of the element, quite the opposite of the extension indicated by q. In such instances the letter y is doubled and does not employ a vowel of its own nor affect juxtaposition. The space applied is considered part of the marked element following, as in the example of FIG. 16. The network 16 adjusts the elements accordingly.

The vowels i and o are also used to create lateral displacement of elements to the left and right respectively of the vertical center line of the image being formed by the network 16. Thus, elements displaced above crosses are juxtaposed above the horizontal crossbar and are typed as in FIG. 17. If the element below a displaced element is also displaced, than it is also typed with a displacing vowel. But if the element below a displaced element is aligned with the vertical center line of the structure being typed, then it is typed with normal juxtapositional vowel e or sometimes u if it overwrites. Examples appear in FIG. 18.

In FIG. 1 the operating network 16 responds to the typing upon the keyboard 12 and the resulting output from the transducer 15 by energizing one of five generators 34, 36, 38, 40 or 42. The consonant signal generator 34 is composed of separate pulsers, respective ones of which emit a pulse in response to typing of the letters p, b, t, d, k, g, s, z, f, v, m, n, c, j, l, r, x, or h. The vowel signal generator 36 is composed of separate pulsers, each responding to one of the vowels a, e, i, o, or u. The numeral signal generator 38 possesses respective pulsers responding to numerals 1 through 7. The reset signal generator 40 possesses pulsers each responding to one of the symbols *, ), )), (, -, and blank space. A miscellaneous generator 42 possesses pulsers responding respectively to the typing of q, y, w, /. An element selector generator 44 responds to a pulse from one of the pulsers in the consonant signal generator and one of the pulses from the vowel signal generator, when a consonant and and a vowel follow each other, to produce outputs along preselected output lines 46 on the basis of whether the consonant preceded the vowel or the vowel preceded the consonant. Thus, for the eighteen consonants entered into the keyboard combined with suitable vowels, as previously described, the element signal generator emits signals along thirty-six output lines 46. The signals along the lines 46 energize the appropriate gate in a time sharing selector gate system 48 which receives the horizontal and vertical voltages coming from an element voltage former 50 that generates horizontal and vertical voltage signals corresponding to each of the 36 elements so that they can be formed with these voltages by applying them to the deflection plates of a cathode ray tube. The time sharing selector gate system 48 further fits the selected elements that have been typed into the keyboard and indicated by the elements selector generator into successive time slots on a time sharing multiplex basis.

At the same time, a position and size computer 52 receiving the output signals from the elements selector generator 44 and the vowel signal generator 36 as well as the numeral signal generator 38 computes the size each element is to be as such element is entered on the basis of the number of elements in each horizontal level and the number of horizontal levels in each structure, section and character. Computer 52 also computes the position each element is to occupy on the basis of the particular vowel with which it is associated that determines whether it is below, to the side, or otherwise juxtaposed relative to a previous element and whether it is to occupy one or another portion of the character, that is section, as determined by the numeral signal generator. The computer 52 operates a time sharing position and size biasing network 54 that suitably attenuates and applies DC biasing potentials to each of the signals in each of the time slots emerging from the time sharing selector gate system 48. An adjustment circuit 56 passes the signal from the time sharing position and size biasing network 54 to the deflection plates of the cathode ray tube 18. This adjusting circuit 56 may at the operator's option be manually controlled so that the ultimate appearance of the character on the scope conforms to normal esthetic principles. The operator may also control it manually so that desirable options such as bold-face, under or side-lining and the like may be employed.

The position and size computer 52 also establishes outputs which respond to the output from the miscellaneous signal generator in response to the nomenclature q, y, w and / being typed. The typing of the letter q biases the particular element into its mutant form. This involves the use of attenuating and biasing networks.

Figure 18A:
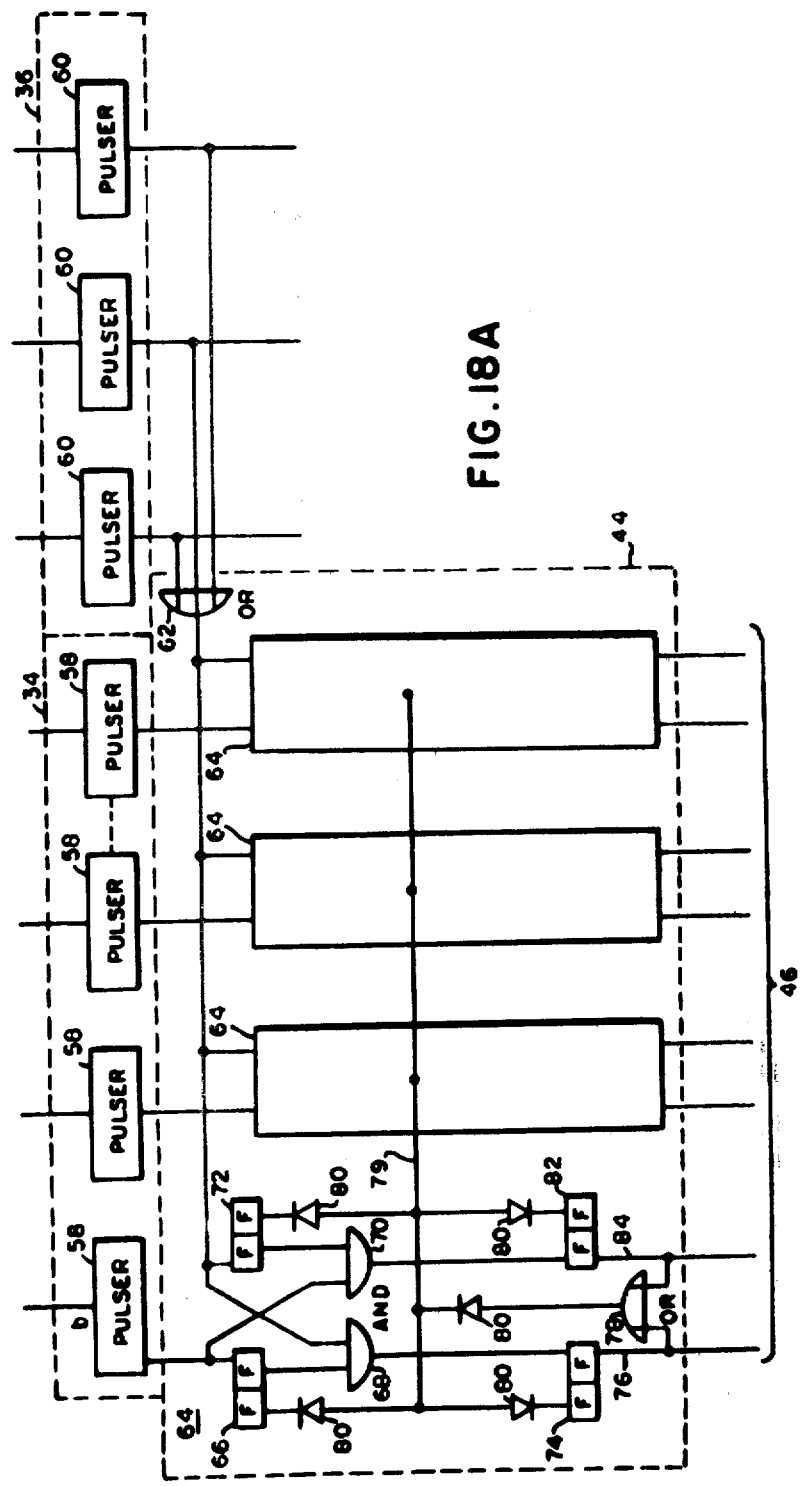
FIG. 18a is a schematic block diagram illustrating details of the apparatus in FIG. 1.

An example of some of the details of the circuits in the network 16, particularly the manner in which the element selector generator 44 is contemplated or operates appears in FIG. 18A. Here, as mentioned, the consonant signal generator 34 is composed of eighteen pulsers 58 each responding to one of the consonants being typed. Similarly, five pulsers 60 constitute the pulsers of the vowel signal generator 36. The element selector generator 44 further comprises OR circuit 62. The OR circuit 62 applies a signal, when any of the pulsers 60 are actuated by typing any one of the vowels, to one of eighteen sequence discriminator circuits 64 in the element selector generator 44. One of such discriminator circuits 64 appears in detail. In addition to receiving signals from the OR circuit 62 it receives signals from its associated consonant pulser 58. The purpose of the circuit 64 is to determine whether the consonant signal arrived before the vowel signal or the vowel signal arrived before the consonant signal.

When a consonant signal arrives first the pulser 58 being activated applies a pulse signal to one side of a flip-flop circuit 66 and switches it from its quiescent stable condition to its active stable condition where it applies a signal to an AND circuit 68. Since the flip-flop circuit 66 is stable it continues to apply the signal to the AND circuit. At same time, the pulser 58 applies a simple pulse to an AND circuit 70. However, this pulse lasts only momentarily and is short enough so that it will remove the signal from the AND circuit before a subsequent signal arrives. Upon a vowel being entered into the keyboard 12 and one of the pulsers 60 applying a signal to the OR circuit 62 a pulse is applied to the AND circuit 68 having the flip-flop signal thereon. At the same time the same pulse shifts a flip-flop circuit 72 from its quiescent state to apply a continuous signal upon the AND circuit 70. The pulse upon the AND circuit 68, when combined with the continuous signal from the flip-flop 66, actuates the AND circuit 68 to shift a flip-flop 74 into its active stable state. This produces an output at the line 76 indicating that the consonant of the pair of vowel consonant combination arrived first. An OR circuit 78 responding to this output applies a suitable signal to a line 79. The latter carries the signal to all the flip-flops in the sequence discriminator circuit 64 so as to set them into their quiescent state for the arrival of subsequent consonant vowel combinations. The flip-flops are set through diodes 80.

In the event that the vowel signal is entered first the signal from the OR circuit 62 first shifts the flip-flop 72 to its active state and applies a continuous signal at the AND circuits 70. Only a pulse of short duration appears at the AND circuit 68. This goes away almost immediately. By the time the successive consonant pulse arrives at the flip-flop 66 the AND circuit 68 is inactivated. However, at the same time, the pulse appears at the AND circuit 70 and activates a flip-flop 82 to produce an output at the line 84 indicating that the vowel precedes the consonant. The OR circuit 78 again then shifts all the flip-flop circuits back to their quiescent state for the upcoming vowel consonant combinations.

In this manner, for each consonant there can exist two elements which are properly selected in the time sharing selector gate system. The outputs along the line 76 and 84 and their corresponding outputs from other circuits 64 are applied to the position time computer as described with respect to FIG. 1.

The circuit of FIG. 1 is thus able to respond to entries by producing any character existing in the Chinese language, and if desired, its output may be changed by manual adjustment in the adjustment circuit 56. After each character is entered and a new character is started by means of the numeral being entered into the keyboard, the optical system 30 records the picture of the character on the face of the cathode ray tube 18 onto the printer 32 and a motor M advances the printer 32 in position for the next character.

To achieve a certain amount of elegance and require a minimum of manual adjustment the computer 52 in the network 16 performs certain biasing functions and is programmed to do this in response to particular inputs. For example, if elements are displaced to both right and left the computer 52 and the network 16 places the right element on the same level as the immediately preceding left element as in the examples of FIG. 19. When the elements are spread across a horizontal level none are considered displaced and the elemental space is used to achieve proper spacing and size as in the examples of FIG. 20. This involves the use of the letter y. The position and size computer operates to obtain the resulting character configuration in the computer. In ambiguous cases which are fortunately very rare, any structure beginning with a displaced element and following other structures in the same section is vertically juxtaposed by the computer 52. This is shown by the position of ocedpu in the example of FIG. 21. A blank space is entered before such displaced element for clarity.

When a cross, oblique cross, or slant cross is juxtaposed below other elements the position and size computer places the upper portion of the cross in such a position as to penetrate any free space in the structure above. In other words, wherever such space exists the horizontal cross bar, or midpoint in the case of the oblique ones, is the juxtapositional referent. Examples are shown in FIG. 22.

The computer 52 creates overwriting by responding to the letter u to form the so-called u-ablaut of the vowel of the overwriting element, which is written following the elements overwritten. In its simplest form overwriting extends over all previously written elements as in the examples of FIG. 23. The signals from the reset signal generator 40 of the terminal marker, (, causes the computer 52 to create an end to the overwriting. When overwriting elements composed of single lines in one direction the operator enters the terminal marker, (, and the computer 52 places the boundary immediately preceding the bounded element. This is shown by the examples of FIG. 24. For elements such as corners or rectangles which have both horizontal and vertical or slant components, the computer 52 responds to the marker being placed before the element to indicate top and/or left boundary and the marker after the element to indicate right and/or bottom boundaries. Precise indications of boundary are necessary to distinguish structures of similar form, as in examples of FIG. 25. Here the boundary members clearly distinguish between the last two structures.

The computer 52 is also set to respond to additional rules which the entering operator follows to lend additional understanding and elegance to the typing procedure. For example, placement of the overwriting terminal marker after an element representing a rectangle or corner may cause some ambiguity with respect to the element following. The computer as well as the generator follow the rule that the marker is assumed to mark a boundary on the rectangle or corner as in example FIG. 26. However, in cases where the boundary lies on the following element the computer 52 and the operator follow the rule that a blank space precedes the marker for clarity. Such instances are infrequent but occur in such structures as shown in FIG. 27.

If only the elements within a container are overwritten then the computer 52 as well as the operator follow the rule that the overwriting element is written within the terminals of the containment and may not overwrite them. Examples appear in FIG. 28. If an element overwrites the container as well as the contained, then the operator and the computer 52 follow the rule placing it outside the terminals of the containment as shown in FIG. 29. When an overwriting element vertically divides a container containing elements not overwritten, then the overwriting element is written first and the contained elements are juxtaposed relative to the overwriting element as shown by the examples in FIG. 30. Overwriting elements horizontally dividing a container which contains elements not overwritten follow the rule that the overwriting element is written first and contained elements are juxtaposed relative to the immediate preceding container as in examples of FIG. 31.

Since corners and angles are composed of components in two directions the operator and computer must make a choice when they are overwritten. For overwriting by horizontals or verticals the crossing point is incidentally determined, that is horizontals cross the verticals or the slant portion while verticals cross the horizontal portion of corners and angles. For overwriting by slants the rules are that left slant crosses the upper portion of corners and angles and right slant crosses the lower portion of corner and angles. Examples of this are shown in FIG. 32. Crosses, which overwrite only above the crossbar, are overwritten only below the crossbar. The crossbar itself does not overwrite. FIG. 33 illustrates some examples.

In overwriting corners and angles or any contaniner it is convenient to apply the following restrictions so that the computer and the operator perform according to the following rule: Any element whose overwriting portion consists of a single straight line overwriting one side of a container, be it a single element or a structure of more than one element, may overwrite any parallel side and any contained elements of such container not terminally marked, but may not overwrite any non-parallel side as in examples of FIG. 34.

For convenience the circuit 16 and partially the computer 52 are arranged so that it follows the other rules set for the operator entering the elements, as follows:

Because of the restricted overwriting function of certain elements and additional restrictions imposed by these writing rules under certain conditions some elements may not be written but must be synthesized from simpler elements. Chief among such cases are the crosses. The examples of FIG. 35 clarify this rule.

Dots, ca and ac, latterly displaced to the left or right of the vertical center line of any structure may not be overwritten by any vertical or mutant slant within that structure; that is they are displaced beyond the reach of the overwriting. In structures composed of a series of successive overwritings, juxtaposition is determined incidentally. However, a series of parallel or partly parallel overwritings are vertically juxtaposed if the overwriting elements are horizontal. Moreover they are horizontally juxtaposed if the overwriting elements are vertical. Examples of these three cases appear in first three characters of FIG. 36. To achieve consistency in the nomenclature when choosing the overwriting element in ambiguous cases, the operator and computer 52 follow the priority rules that first the element which overwrites the most elements is the overwriting element. Second, the simple element overwrites the complex, and third, vertical overwrites the horizontal.

To further avoid ambiguities all non-mutant q-forms extend from their starting point to the limit of the space available for writing. No problem arises from the case of horizontals, but in the case of verticals it is useful to observe the following rule: Any element juxtaposed horizontally with respect to a vertical q-form shall evenly divide the space to the right of such q-form with those elements juxtaposed directly below it. The examples of FIG. 37 help clarify the operation of this rule.

Sometimes portions of a character may exhibit a complexity which requires juxtaposition of structures rather than elements. Such juxtaposition is called resection and is of two types, horizontal and vertical. Horizontal resection, inidcated by the resection marker, /, followed by an element in horixontal juxtaposition, means that the structure following the resection marker is written at the same horizontal level as the structure preceding, back to the previous boundary. The computer and the remainder of circuit 16 perform this function in response to the resection marker. If a boundary must be supplied, the resection terminal marker, -, is used. An example of such a character and its typing entry appears in FIG. 38. Vertical resection, indicated by the resection marker, /, followed by an element in vertical juxtaposition occurs when a vertical q-form appears in some structures, and it is necessary to mark a terminal to its otherwise continuing extent. An example of such a character and its entry form appears in FIG. 39. An additional marker to indicate the final terminal of resection is unnecessary since all such resections seem to compose sections of characters and the boundaries are inherent.

Resection can be avoided through resort to economical alternatives achieved through the writing rules. For example, the structure shown in FIG. 40 can be written using resection as shown by the first typed entry in FIG. 40 but is more economically rendered by resorting to containment rather than resection nomenclature as shown in the second entry.

A phenomenon similar to resection, but similar and more frequent in occurrence, is reduplication. Significant economy is obtained in the nomenclature in cases where structures rather than elements are reduplicated. The reduplication marker w followed by appropriate vowel is placed immediately following the last element in the structure to be reduplicated. If the reduplication structure is a section or container other markers may intervene.

Reduplication applies to all preceding elements back to preceding boundary. If necessary to indicate a boundary the resection terminal marker, -, is used. Some examples of reduplication are illustrated in FIG. 41.

The hooks, elements ha, ah are unique in the table of elements, being the only elements, aside from elemental space of course, with zero stroke count. Under most ordinary circumstances the hooks may be conveniently and economically ignored, as in fact they are ignored in many type fonts and writing styles. There are certain situations in which the hooks served a discretionary function, being the only element distinguishing two otherwise identical characters. An example appears in FIG. 42. In such cases, which are very rare, the hook may not be ignored. If for asthetic reasons a user wishes to employ the hooks, a few criteria must be used. The left hook ha is actually a clockwise hook differing in orientation depending upon its juxtaposition. Thus, the character shown in FIG. 43 contains two hooks ha and he. The hook may not contain other elements and may not overwrite or be overwritten, and juxtaposition is relative to the element to which the hook is attached, that is the element immediately preceding. In a similar fashion the right hook is counter-clockwise as shown in FIG. 44.

For achieving essential consistency in the nomenclature, structures should be such as to use the fewest possible elements, consistent with the writing rules. Elements themselves may be synthesized only when it is not possible to write a structure within the limitations imposed by the writing rules. In other cases, the operator should use the minimum possible number of elements and other indicators.

It will be noted that the writing rules serve mainly to reduce the number of entries necessary for achieving a particular result in the ultimate output. The computer 52 needs simply to be programmed for such an arrangement.

FIG. 45 illustrates a system for transmitting Chinese language characters back and forth over distances. Here the output of the transducer 15 in the circuit 10 is transmitted directly across a line or other transmission medium 90 to a receiving station composed of a circuit 16 and 20. The receiving station also has a transmitter corresponding to the circuit 10 which in turn can transmit signals over the transmitting medium 90 back to the original transmitter having circuit 16 and a circuit 20.

The invention may also be utilized in entering information into a memory for the purpose of classification. Here as shown in FIG. 46 a memory 92 is placed between the circuit 10 and the circuit 16. Information from the transducer 15 is fed into the memory and retrieved by a read-out device 94 from which it may be fed to the circuit 16 when the information is desired. The read-out device may also retrieve the stored information and transmit it to a classifying device, or to a transmitting medium for read-out elsewhere.

Figure 47:
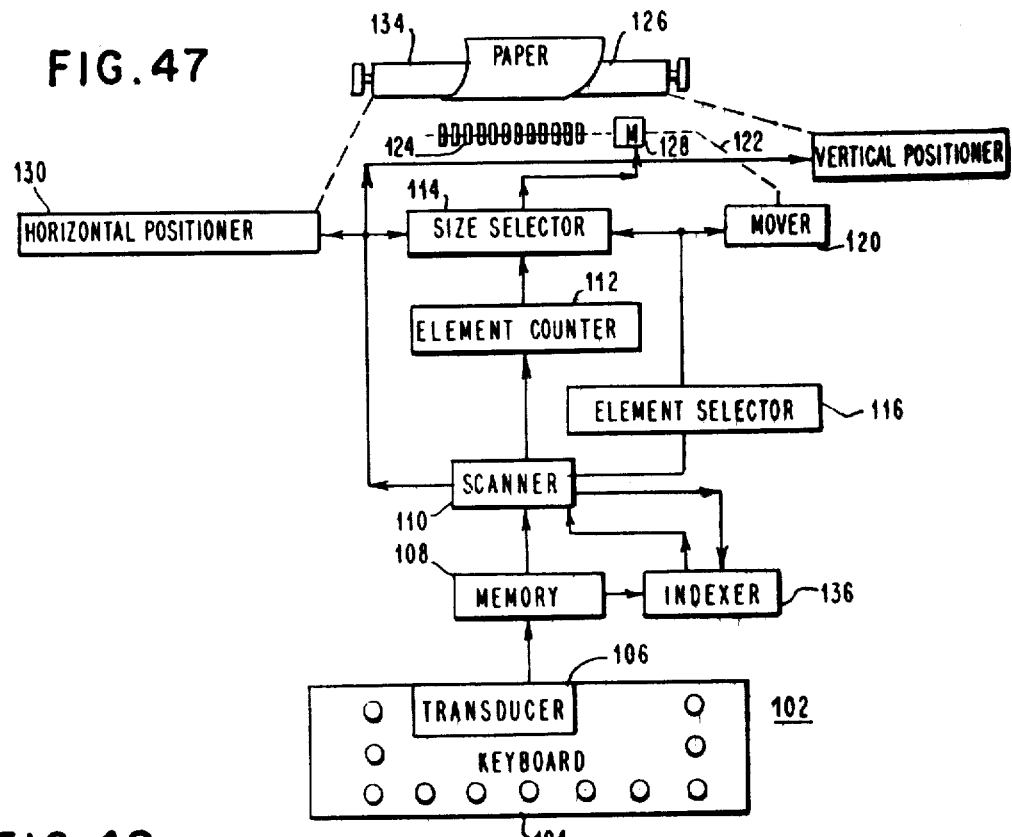
FIG. 47 is a partly schematic, partly pictoral block diagram of a Chinese language typewriter embodying features of the invention, and including an indexing mechanism also embodying features of the invention.

FIG. 47 illustrates still another embodiment of the invention. Here an input mechanism 102 corresponds to a conventional typewriter having a keyboard 104, but includes a transducer 106 that transmits electrical signals corresponding to the letters and symbols being struck on the keyboard as in FIG. 1 into an electronic memory 108. The latter stores the transmitted signals until a signal marking the end of a complete Chinese language character is struck on the keyboard. The memory 108 then energizes a scanner 110.

The scanner 110 scans the memory 108 and transmits the number of elements to an element counter 112. The latter recognizes the complexity of the character and the appropriate size of the average element. It enters the information into a size selector 114. The latter also receives information from an element selector 116 which from the scanner 110 has entered therein the first scanned element together with the gross form of the character so that the size selector 114 can consider whether the element is part of an enclosing or enclosed section.

The element selector 116 energizes a mover 120 composed of a motor that axially moves a frame 122. The latter supports a set of coaxially arranged type discs 124. Each type disc 124 carries on its edge raised type faces in the form of one of the elements in graduated sizes within the size range suitable for such elements in Chinese language characters. The mover 120 moves the frame 122 until the disc having the element selected by the element selector 116 and the area of the character section to be typed on a paper carried by the platen 126 are juxtaposed. The size selector 114 energized by the stroke counter 112 starts a motor 128 which rotates the discs on the frame 122 until the correct size type on the face appears opposite the typing area for the character to be typed.

The scanner 110 now energizes a horizontal positioner 130 and vertical positioner 132 that raises and lowers the platen 134 so as to place the element type face on the disc opposite the portion of the space in which the character is to be typed that will be occupied by the element on the disc. The element is then struck. The scanner 110 goes to the next elements to be entered until the entire character is typed. An operator then enters the next character in the keyboard. The platen is shifted manually or automatically to the next character position on the paper.

An indexer 136 responding to the memory 108 receives the entry for each character and stores it. It also alphabetizes the character on the basis of its English language spelling so that the scanner 110 can trigger it and retrieve the character as desired.

In effect the keyboard 104, memory 108 and indexer 136 form complete indexing system of its own. An operator need merely enter each character by its elements into the indexer 136 through the memory 108. The indexer 136 then arranges the characters on the basis of their entry alphabet. To read out the scanner 110 or other means recovers the alphabetized information from the indexer 136. The indexer may for example be a punch tape arrangement that allows for alphabetical recovery.

Figure 48:
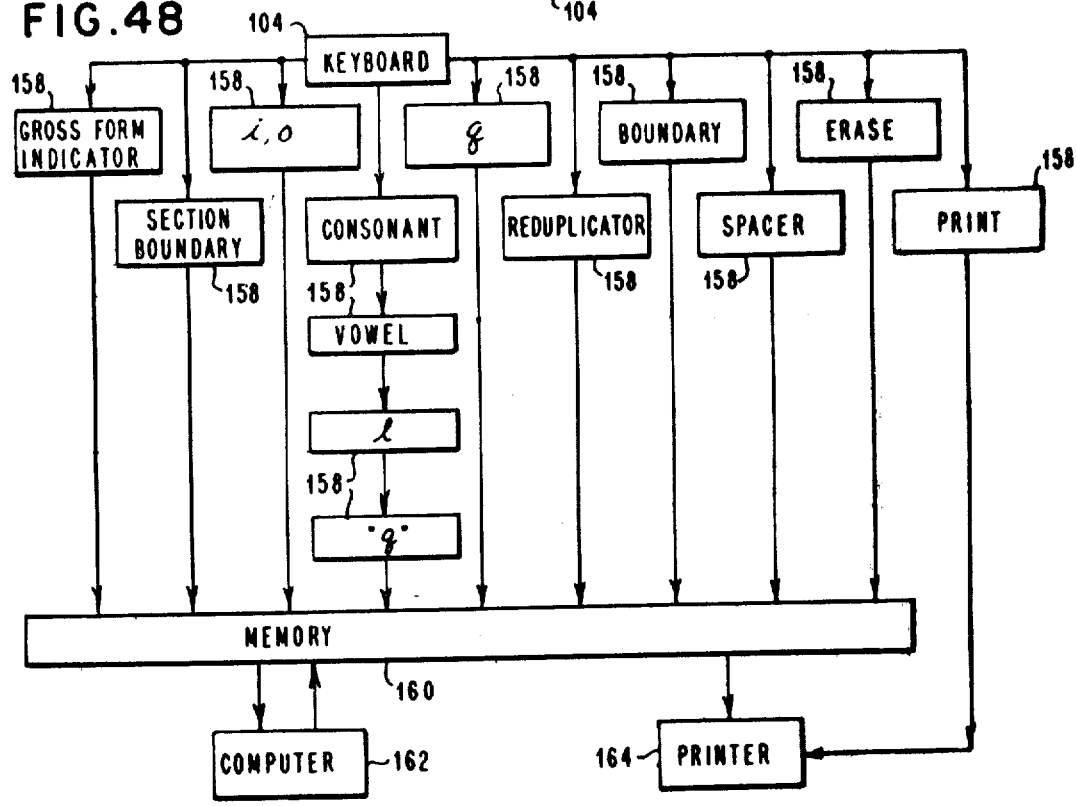
FIG. 48 is a block diagram of still another typewriter embodying features of the invention.

FIG. 48 illustrates still another embodiment of the invention. Here the keyboard 104 energizes the indicators 158 shown and feeds them into a memory 160. A computer 162 determines the character configuration and number of sections. It counts the structures and elements horizontally and vertically within sections to determine the sizing and spacing. The computer 162 then feeds this information back into the memory and to a printer 164 as instructions for printout.

Figure 49:
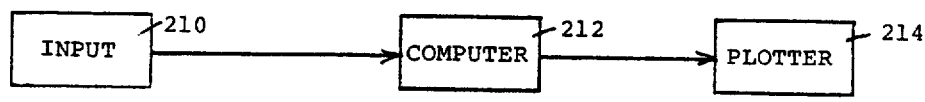
FIG. 49 is a schematic block diagram of a system embodying features of the invention.

In FIG. 49, an input 210 furnishes signals to a computer 212. The computer controls a plotter 214. The computer is a General Electric 635 computer. This computer may now be referred to as a General Electric-Honeywell 635 computer, or a Honeywell-General Electric 635 computer. The plotter 214 is available commercially under the trademark "Draftomatic" from the Benson-Lehner Company. According to one embodiment of the invention the input is composed of a keypunch machine at which an operator enters the symbols.

For each group of symbols entered the machine punches a card. The resulting deck of punched cards is entered into the compiler of the computer 212 for processing by the computer.

According to another embodiment of the invention the operator or typist at the input 210 performs the same function as previously, namely entering symbols that represent elements, gross form, sections, etc., and the input encodes these symbols on tape. The computer 212 then scans the tape to process the sequential information thereon.

According to another embodiment of the invention the symbols entered by the operator into the input 210 are fed directly into the memory of the computer, where processed.

Figure 50:
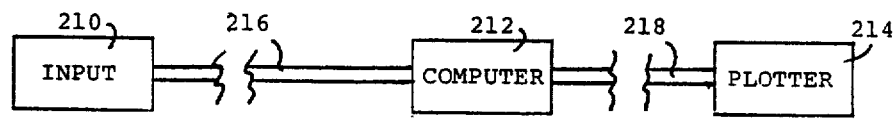
FIG. 50 is a block diagram of another system embodying features of the invention.
Figure 51:
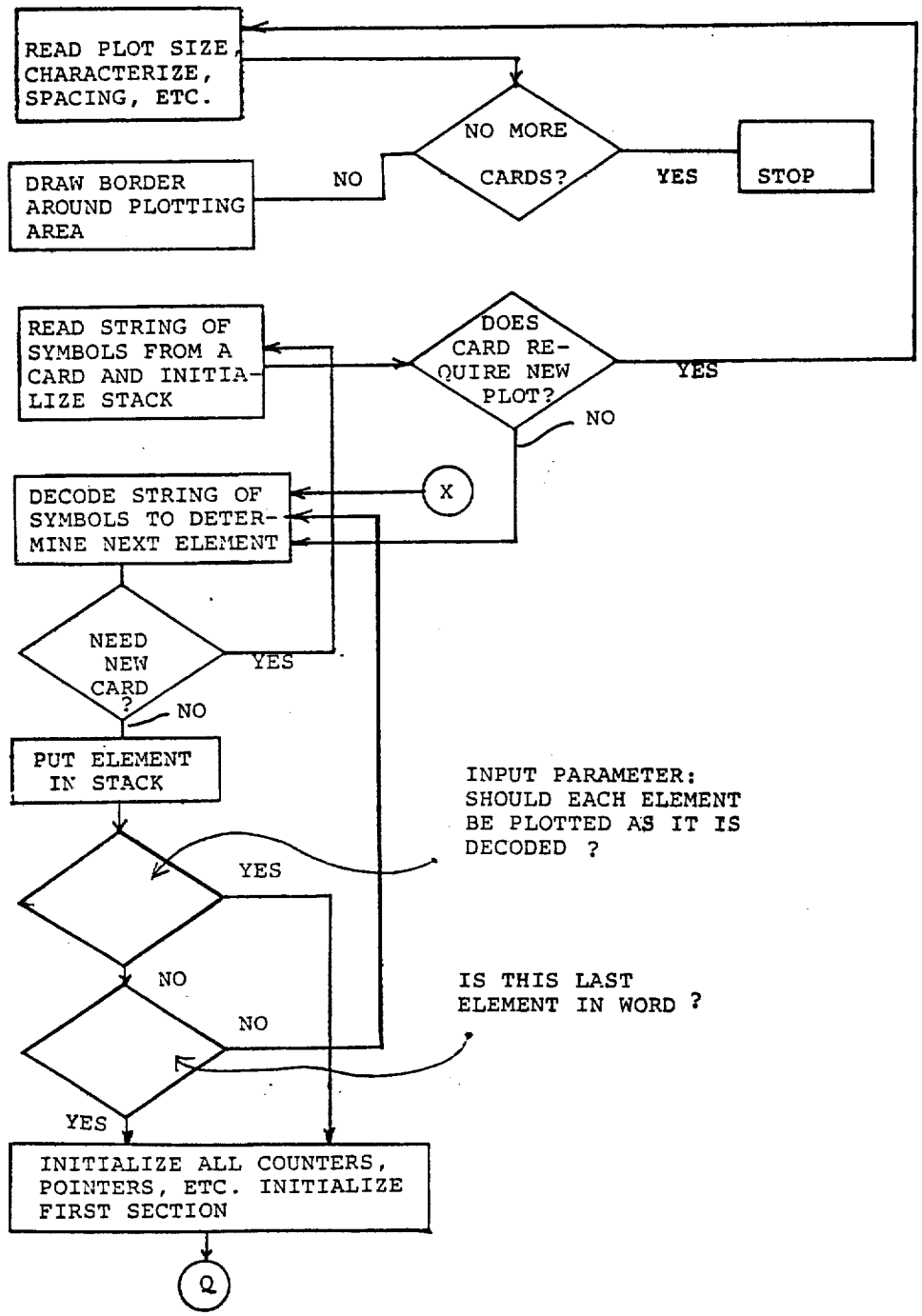
FIGS. 51–54 are flow charts illustrating the manner in which the internal structure of the computers in FIGS. 49 and 50 is changed to produce results according to the invention.
Figure 52:
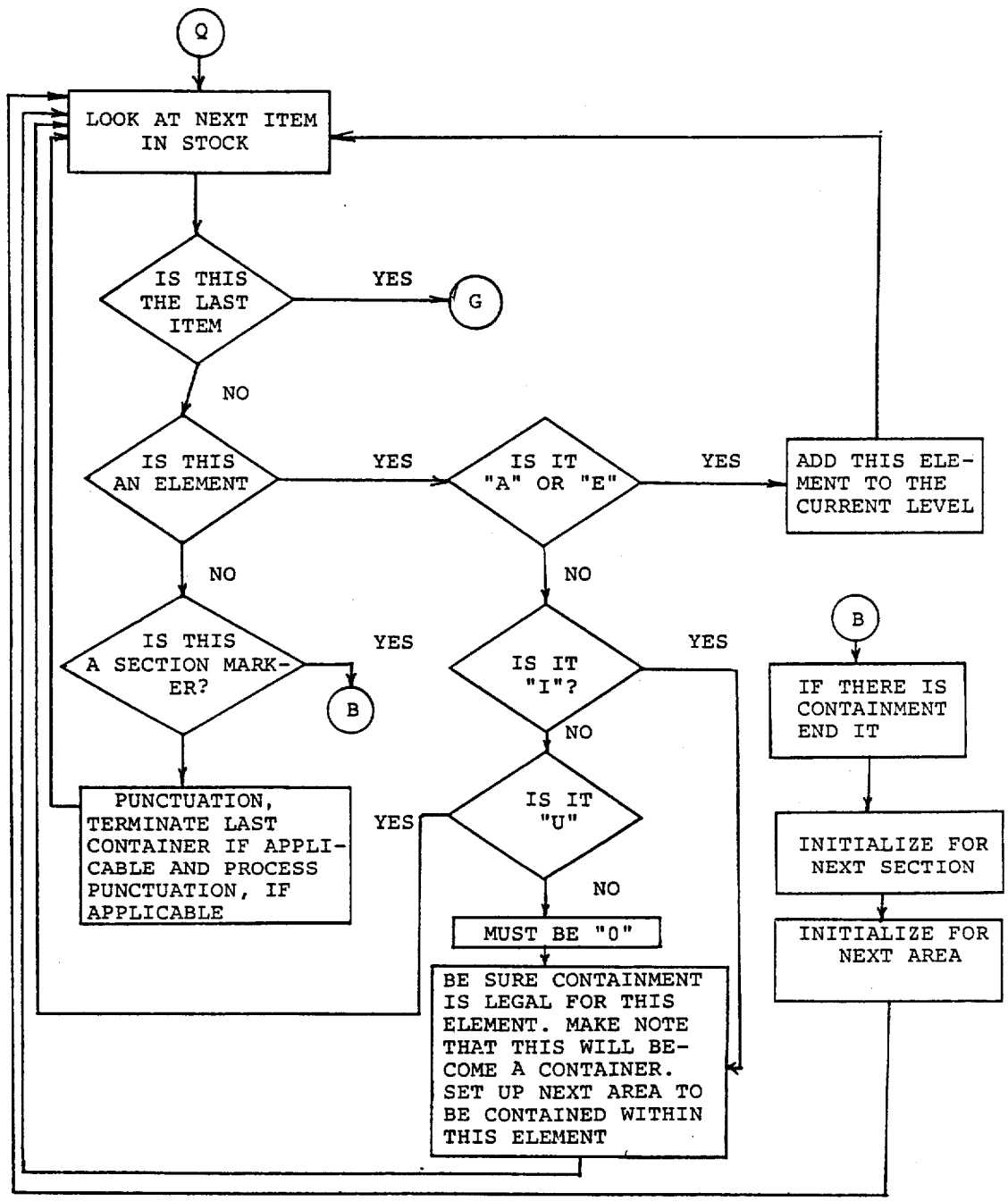
Figure 53:
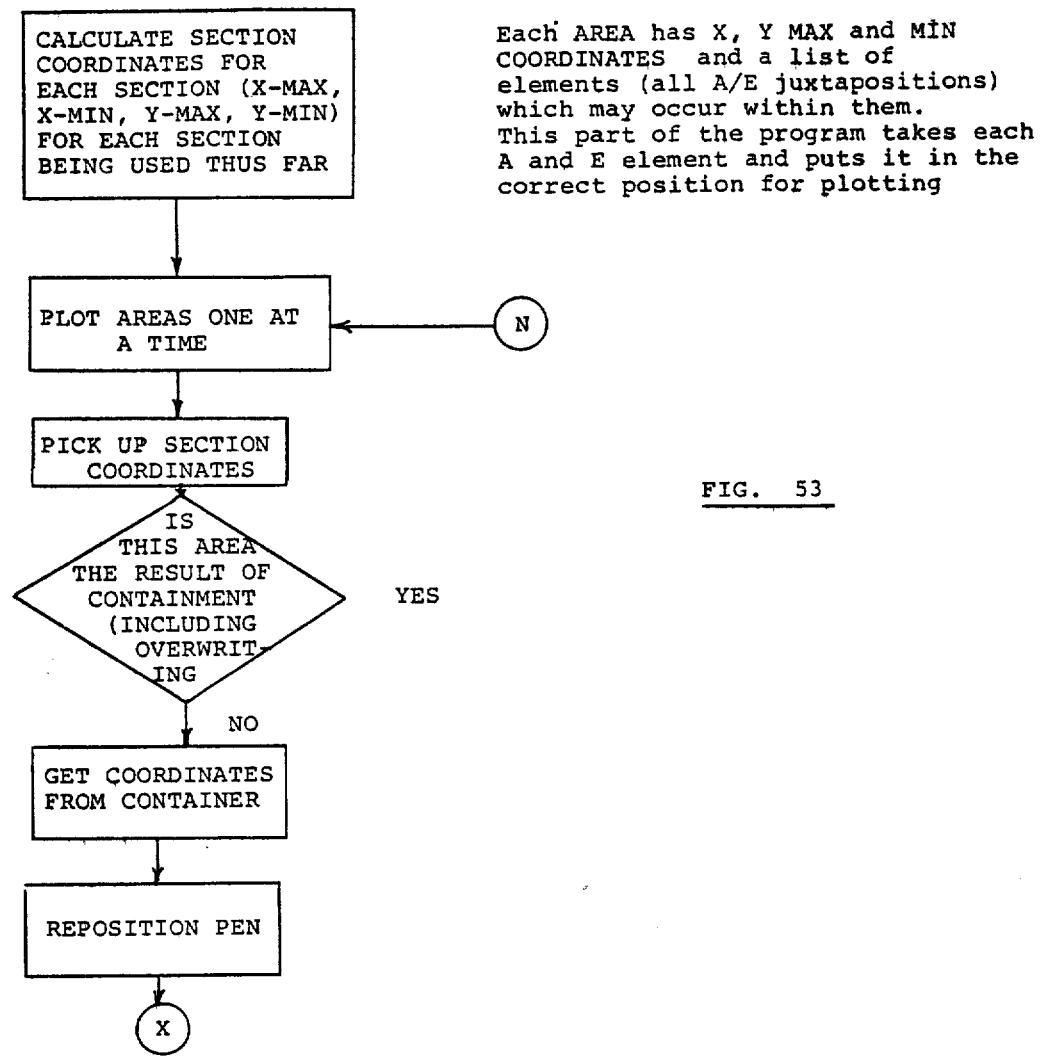
Figure 54:
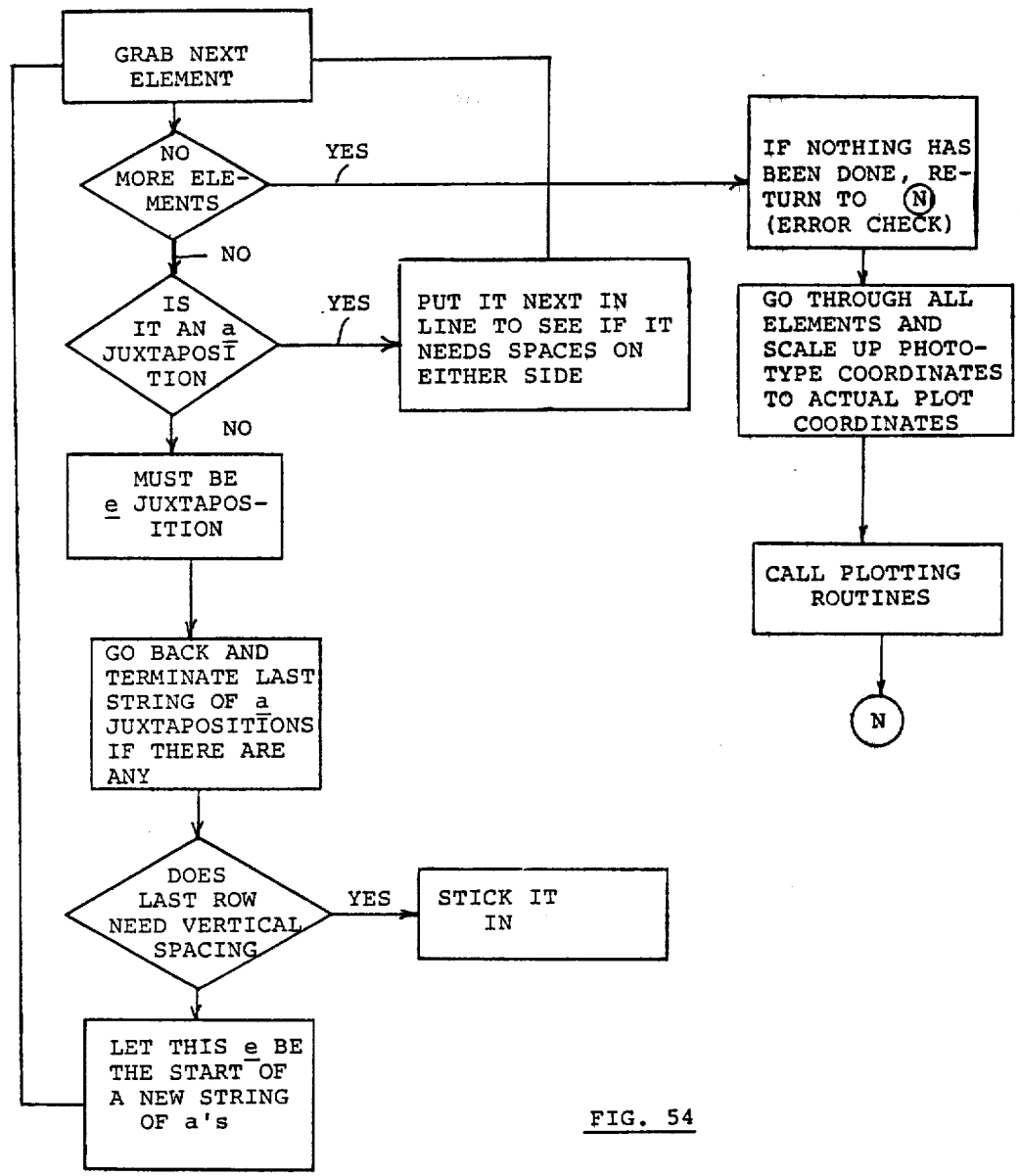

FIG. 50 illustrates another embodiment of the invention. In FIG. 50 the input 210 is separated from the computer 212 by a transmission line 216 remote from the computer. Moreover, the plotter 214 is separated from the computer 212 by a transmission line 218. This illustrates that the computer of FIG. 49 can operate over large distances.

The structure of the computer 212, that is its internal function-controlling structure, is altered in a known manner by a so called "program". The program may be entered into the computer to change its structure in any well known manner, a common one of which is by punching cards and processing these with a compiler. FIGS. 51-54 illustrate, by way of a flow chart the functions that the structure of the computer is "programmed" to perform. The flow chart can readily be understood from a consideration of the described rules.

The program listing for programming the computer to perform these functions follows. Following the program listing are the input instructions which an operator may combine with the program to cause the plotter 214 to produce writing in Chinese.

It should be noted that the program used to change the structure of the general-purpose computer 212, and the method performed therewith constitute yet another embodiment of the invention. This embodiment differs from other embodiments shown in employing, for example, variant element set, containment specifications, gross form entry sequence, etc.

While embodiments of the invention have been described in detail it will be obvious to those skilled in the art that the invention may be embodied otherwise without departing from its spirit and scope.

What is claimed is:

1. The method of transcribing non-alphabetic characters comprising, entering into a computer one of a given finite plurality of symbols defining one of the elements in the character, successively entering into the computer given finite pluralities of symbols defining other elements in the character, and entering with the given finite plurality of symbols defining other elements in the character predetermined ones of a finite plurality of symbols defining the position of the other elements relative to the element defined by the previous symbol, in the computer decoding the string of symbols to determine a successive element, determining the element, determining the position of the element relative to the previous element, and plotting the elements on the basis of the information in the computer.

2. An apparatus as in claim 1, wherein the symbols define elements in the shapes of lines, crosses, hooks, acute angles, dots, squares, and substantially right angles.

3. An apparatus for transcribing non-alphabetic characters, comprising a computer, input means for successively entering into said computer predetermined ones of a finite plurality of symbols defining elements in a character and entering with the symbols defining elements in the character predetermined ones of a plurality of finite symbols defining the position of other elements relative to the element defined by the previous symbol, said computer having a structure determined by a program, said structure including means for producing signals for plotting said elements relative to each other, and writing means responsive to said computer for writing the characters.

4. An apparatus for transcribing non-alphabetic characters composed of a plurality of elements having variable juxtapositions, comprising input means for presenting a string of symbols collectively representing a plurality of elements and their interpositional relationships as well as the beginnings and ends of the characters; a computer of variable structure structured to form decode means responsive to said input means for decoding the string of symbols to determine the elements, position defining means responsive to said input means for defining the positions relative to one another, and coordinate means responsive to said decode means and position determining means for establishing the sizes of the elements relative to each other and their coordinates as well as their positions on the basis of the number of at least some of the elements; and plotting means responsive to said coordinate means for producing visual images of the elements and thereby forming a character.

5. An apparatus as in claim 4, wherein said input means includes sizing means for determining the size of the characters to be formed and the spacing between the characters.

6. An apparatus as in claim 5, wherein said position determining means includes section forming means responsive to the string of symbols for defining a number and shape of sections in which the elements of a character are to be placed and for causing said coordinate means to confine a plurality of the elements in a character in one section and a plurality of elements in a character in another section.

7. An apparatus as in claim 5, wherein said input means includes keyboard means for producing predetermined ones of a finite plurality of symbols defining elements in a character and entering with the symbols defining elements in the character predetermined ones of a plurality of finite symbols defining the position of other elements relative to the element defined by the previous symbol.

8. An apparatus as in claim 4, wherein said position determining means includes section forming means responsive to the string of symbols for defining a number and shape of sections in which the elements of a character are to be placed and for causing said coordinate means to confine a plurality of the elements in a character in one section and a plurality of elements in a character in another section.

9. An apparatus as in claim 8, wherein the symbols define elements in the shapes of lines, crosses, hooks, acute angles, dots, squares, and substantially right angles.

10. The method of transcribing non-alphabetic characters, comprising the step of detecting a string of predetermined ones of a finite plurality of symbols defining elements of the character and predetermined ones of a finite plurality of symbols defining the position of the elements relative to each other, in a computer decoding the string of symbols to determine one element from the next, decoding the string of symbols to determine the position of one element relative to the previous element, determining the size of each of the elements on the basis of at least a number of the elements, and plotting the elements on the basis of the information in the computer.

11. A method as in claim 10, further comprising the step of determining from the string of symbols the gross form of the character and grouping the elements of the character and their sizes on the basis of the gross form.

* * * * *